Patented July 10, 1945

2,380,003

UNITED STATES PATENT OFFICE 2,380,003

TEXTILE PRODUCT

William Whitehead, Rye, N. Y., assignor to Celanese Corporation of America, a corporation of Delaware No Drawing. Application April 2, 1941,
Serial No. 386,449

3 Claims. (Cl. 8—131)

This invention relates to textile materials and relates more particularly to the preparation of compact yarns, cords or braids and to webbings, tapes and similar articles woven or knitted with such yarns, cords and the like.

An object of my invention is the bonding of yarns, cords or braids, made of or containing thermoplastic textile materials, either as such or when in webbings, tapes and similar articles, in an efficient manner to form a composite product of compact structure.

Another object of my invention is the bonding of said products by means of solvent vapors to yield composite textile products which are evenly bonded, strong, flexible, and which retain their compact structure under conditions of service wherein they are subjected to stresses such as flexing and tensioning.

Other objects of my invention will appear from the following detailed description.

Yarns or other textile products of some strength and compactness may be prepared by twisting, braiding or otherwise associating yarns of a non-thermoplastic textile material with yarns made of or containing a thermoplastic textile material and then treating the resulting composite yarn so that the thermoplastic material contained therein is at least partially softened or dissolved in such a manner that the non-thermoplastic yarns are bonded together thereby and form a compact and unitary structure. Composite yarns made in this way have many uses where compact, non-voluminous products are desired. Usually, the thermoplastic materials associated with the yarns have been softened or coalesced by the use of heat, combined heat and pressure, or by passing the twisted yarn through a bath containing a solvent or restricted solvent for the thermoplastic material. Such methods involved difficulties in obtaining uniform results and have also occasioned undesirable loss of solvent. Moreover, the use of these solvents involves fire and/or explosion hazards. Liquid application of solvent has been difficult to control since such application tended to flush out the solvent soluble component or the solvent failed to penetrate and effect a uniform softening, dissolving or coalescing action.

I have now discovered that these difficulties in bonding may be overcome if composite yarns of relatively non-thermoplastic textile materials twisted or otherwise associated with thermoplastic textile materials are bonded by exposing the composite yarn to the action, in vapor form, of solvent or softening agent for the thermoplastic textile material contained therein. By this treatment, the vapors of the solvent or softening agent are caused to penetrate the structure of the composite yarn to an unusually uniform degree and to cause the thermoplastic material contained therein at least partially to soften or dissolve. This softening or dissolving of the thermoplastic material results in the non-thermoplastic materials being bonded therewith into a flexible and permanently compact structure of unusual strength, which product retains its compactness even after long and hard service.

While the invention will be particularly described in connection with the bonding of the composite yarn as such, it is to be understood that in accordance with my invention the composite yarns may be woven or knitted or otherwise formed into fabric, webbing, tape or other articles and the fabrics or article as such exposed to the action of the solvent vapors to effect the bonding of the components of the composite yarn. The fabrics or articles treated in this manner have good body, are very compact and are particularly free from slippage. They also have improved wearing qualities and increased resistance to moisture.

The thermoplastic textile materials, which may be twisted, braided or otherwise associated with the non-thermoplastic materials, may be yarns or fibers of a cellulose derivative, yarns or fibers of synthetic linear polyamide condensation products, or those of other thermoplastic materials such as polymerized vinyl compounds. (The term "yarns," as used hereinafter in the appended claims, is to be construed as including within its scope these textile materials in the form of fibers as well as in the form of yarns. The term "composite yarn" is to be construed as including within its scope cord, braid and other strand-like textile materials, as well as composite yarn.) Examples of said derivatives of cellulose are cellulose esters such as cellulose acetate, cellulose propionate, cellulose butyrate, and mixed esters such as cellulose acetate-propionate and cellulose acetate-butyrate, inorganic ester of cellulose such as cellulose nitrate, or cellulose ethers such as ethyl cellulose or benzyl cellulose. The synthetic linear polyamide condensation products may be derived from diamines and dicarboxylic acids or from amide-forming derivatives of said dicarboxylic acids.

The non-thermoplastic yarns may be made of cotton, linen, silk, regenerated cellulose, or they may be strong yarns of stretched, saponified organic derivatives of cellulose. These non-thermoplastic yarns may also be made of fibers of staple length and have a basis of a derivative of cellulose, or of a synthetic linear polyamide condensation product, blended with non-thermoplastic fibers to give a yarn which is only in part thermoplastic.

The composite yarn may be made in many ways. Yarns of a non-thermoplastic material may be wound or braided about a core yarn of a thermoplastic textile material, or the core yarn may comprise a non-thermoplastic textile material which has wound about it a thermoplastic yarn, and the remaining non-thermoplastic yarns which are to be associated to form the composite yarn may be twisted or braided about such a core yarn. Conveniently, a thermoplastic yarn may be twisted with one or more non-thermoplastic yarns and the composite yarn then bonded, or the composite yarn may consist of several twisted ends of blended yarns containing thermoplastic fibers. Also, the composite yarn may be obtained by utilizing for both the core and the windings, yarns made by spinning a mixture of cotton fibers and cellulose acetate staple fibers, for example, in a proportion of 80:20. While cellulose nitrate may be used, it is less advantageous than the organic derivatives of cellulose due to its inflammable nature.

In order to facilitate the formation of a proper bond between the non-thermoplastic yarns and fibers and the thermoplastic yarns which are twisted or otherwise associated therewith, the thermoplastic yarns or fibers may, if desired, be treated with a plasticizer prior to being twisted or associated with the non-thermoplastic yarns. The plasticizer may be applied to the thermoplastic yarn in any suitable manner as by dipping, spraying, or by passing the yarn over a roller immersed in a trough containing the plasticizer. Or, if desired, the plasticizer may be incorporated in the spinning dope from which the thermoplastic materials are spun into yarns. The composite article containing both the thermoplastic fibers or yarns and the non-thermoplastic fibers or yarns may also have plasticizer applied thereto by treating the whole with an emulsion of the plasticizer. For example, the composite article may be worked for 15 minutes at a temperature of 45° C. in thirty times its weight of water, in which is emulsified 20% of methoxy ethyl phthalate on the weight of the thermoplastic component of the composite material. By such treatment the plasticizer is selectively adsorbed on to the thermoplastic component, which, for example, may be an acetone-soluble cellulose acetate. Similarly, the whole may be treated with an alcohol solution of a plasticizer and aged after evaporating off the alcohol, thus causing the plasticizer to migrate onto and into the thermoplastic component. In this way, for example, from about 5 to 80% or more of plasticizer based on the weight of the thermoplastic yarns or fibers may be applied. Any suitable plasticizer may be employed, such as, for example, dimethyl phthalate, diethyl phthalate, dibutyl tartrate, dimethoxy ethyl phthalate, triethylene glycol, ethyl phthallyl ethyl glycollate, dibutyl phthalate, triphenyl phosphate, tricresyl phosphate, β-trichlorethyl phosphate and monoethyl-p-toluene sulfonamide. The plasticized yarn may be aged before being twisted or associated with the non-thermoplastic yarn or the composite yarn having the plasticized thermoplastic yarn twisted or associated with it may be aged to ensure proper penetration of the plasticizer into the thermoplastic material.

The solvents which have a softening or solvent effect on the thermoplastic materials (all of which are included in the term "softening agent" as used hereinafter in the claims) and which may be used in vapor form for bonding the yarn may be, for example, acetone, acetone and water, ethyl alcohol, mixtures of acetone and methyl or ethyl alcohol, diacetone alcohol, ethylene dichloride and mixtures of ethylene dichloride with methyl or ethyl alcohol, chloroform, mixtures of methyl chloride with ethyl or methyl alcohol, dichlorethylene, and mixtures of dichlorethylene with ethyl or methyl alcohol.

Conveniently, vapors of the solvent or softening agent may be applied to the composite yarn as it is running from package to package during a winding or winding and twisting operation by passing the yarn through a chamber of restricted size containing solvent vapors. The solvent vapor treatment may be carried out at room temperature or at any temperature above or below room temperature, according to the effect desired, the activity of the solvent vapor employed, or the speed with which it is desired to carry out the bonding treatment. Preferably, however, the composite yarns are wound to form suitable yarn packages such as hanks, cops, spools, pirns, bobbins, cheeses, cones, etc. The yarn packages are then placed in a suitable sealed chamber which is then evacuated to the desired degree and the vacuum then broken by the introduction of the desired solvent, preferably heated, which rapidly vaporizes due to the vacuum existing. Due to the evacuated condition of the yarn packages, the solvent vapors penetrate the composite yarns quickly and thoroughly thereby softening or dissolving the thermoplastic component uniformly and causing it to bond to the surrounding non-thermoplastic yarns.

The vacuum may be produced by suitable pumps. The degree of evacuation, the temperature of the chamber, and the amount of solvent added controls the concentration of the solvent vapors in the chamber when the vacuum is broken by introducing solvent. The degree of evacuation will also be determined by the activity of the solvent and the degree of bonding desired. Thus, for example, where a composite textile material containing yarns of cellulose acetate is to be bonded by acetone vapors, the chamber may be evacuated to pressures of from 12 pounds per square inch absolute down to 1 pound per square inch absolute or less, depending on the degree of bonding desired.

In order further to illustrate my invention but without being limited thereto the following examples are given:

*Example I*

An acetone soluble cellulose acetate yarn of 100 denier is wound about a cotton yarn of 10's count to form a yarn suitable as a core yarn for composite, bonded yarns. 6 ends of a cotton yarn of 10's count are twisted about this core yarn and the composite yarn wound onto cones. The cones are then stacked in a chamber adapted to be sealed and attached to a vacuum pump for evacuation. The chamber is then evacuated to a pressure of 1 to 2.5 pounds per square inch absolute. The vacuum is then broken by introducing heated acetone into the chamber where it immediately vaporizes. The chamber is maintained in a sealed condition with the acetone vapors in contact with the yarn packages for about 1 minute with the temperature maintained at 57 to 58° C. Vacuum is then turned on again to remove residual acetone from the yarn, after which the chamber is opened and the cones of yarn are removed. Upon examination, it is observed that the composite yarn, which could be freely untwisted prior to treatment, is now uniformly bonded to the coalesced cellulose acetate, and forms a compact, unitary structure.

*Example II*

10 ends of 840 denier stretched saponified cellulose acetate yarn are braided about a core yarn of 600 denier cellulose acetate to form a composite braid of 9,000 denier. This braided yarn is then wound into hanks and the hanks hung in a chamber. The chamber is then sealed and evacuated to a pressure of about 1.5 pounds per square inch absolute. The vacuum is then broken by the introduction of heated acetone into the chamber where it immediately vaporizes and the hanks are subjected to the action of the acetone vapors for about ½ minute at 70° C. The residual acetone is recovered by again subjecting the chamber to a vacuum for a short time. After the hanks are removed it is observed that the cellulose acetate core has been partially dissolved and dispersed throughout the structure to form a compact, bonded braid.

It is to be understood that the foregoing detailed description is given merely by way of illustration and that many variations may be made therein without departing from the spirit of my invention.

Having described my invention, what I desire to secure by Letters Patent is:

1. Process for the production of a compact bonded yarn, which comprises associating strong yarns of stretched, saponified organic esters of cellulose with thermoplastic yarns having a basis of cellulose acetate to form a composite yarn, and then subjecting said composite yarn to the action of vapors of a softening agent for said thermoplastic material.

2. Process for the production of compact bonded yarns, which comprises associating strong yarns of stretched, saponified organic esters of cellulose with thermoplastic yarns having a basis of cellulose acetate to form composite yarns, subjecting said associated yarns to the action of a vacuum, and then simultaneously breaking said vacuum and exposing the yarns for a short time to the action of vapors of a softening agent for said thermoplastic material.

3. Process for the production of a compact bonded yarn, which comprises associating strong yarns of stretched, saponified organic substitution derivatives of cellulose with thermoplastic yarns having a basis of cellulose acetate to form a composite yarn, subjecting said composite yarn to the action of a vacuum, and then simultaneously breaking said vacuum and exposing the yarn for a short time to the action of acetone vapors.

WILLIAM WHITEHEAD.